United States Patent
Tsukihara et al.

(10) Patent No.: US 9,884,790 B2
(45) Date of Patent: Feb. 6, 2018

(54) CUTTING TOOL

(71) Applicant: Sumitomo Electric Hardmetal Corp., Itami-shi (JP)

(72) Inventors: Nozomi Tsukihara, Itami (JP); Makoto Setoyama, Itami (JP); Katsumi Okamura, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 143 days.

(21) Appl. No.: 14/784,104

(22) PCT Filed: Nov. 25, 2014

(86) PCT No.: PCT/JP2014/081016
§ 371 (c)(1),
(2) Date: Oct. 13, 2015

(87) PCT Pub. No.: WO2015/098393
PCT Pub. Date: Jul. 2, 2015

(65) Prior Publication Data
US 2016/0068449 A1    Mar. 10, 2016

(30) Foreign Application Priority Data
Dec. 26, 2013 (JP) .................... 2013-269437

(51) Int. Cl.
| | |
|---|---|
| C04B 41/87 | (2006.01) |
| C04B 35/5831 | (2006.01) |
| C04B 41/52 | (2006.01) |
| C23C 30/00 | (2006.01) |
| C04B 35/58 | (2006.01) |
| C04B 35/581 | (2006.01) |
| C04B 35/645 | (2006.01) |
| C04B 41/89 | (2006.01) |
| C04B 41/00 | (2006.01) |
| C04B 41/50 | (2006.01) |
| C01B 21/064 | (2006.01) |

(52) U.S. Cl.
CPC .......... *C04B 41/87* (2013.01); *C01B 21/0648* (2013.01); *C04B 35/581* (2013.01); *C04B 35/58014* (2013.01); *C04B 35/5831* (2013.01); *C04B 35/645* (2013.01); *C04B 41/009* (2013.01); *C04B 41/5062* (2013.01); *C04B 41/5068* (2013.01); *C04B 41/52* (2013.01); *C04B 41/89* (2013.01); *C23C 30/005* (2013.01); *C01P 2004/61* (2013.01); *C04B 2235/386* (2013.01); *C04B 2235/3856* (2013.01); *C04B 2235/3865* (2013.01); *C04B 2235/3886* (2013.01); *C04B 2235/5436* (2013.01); *C04B 2235/5445* (2013.01)

(58) Field of Classification Search
USPC .......... 51/307, 309; 428/336, 698, 701, 702, 428/704
See application file for complete search history.

(56) References Cited

U.S. PATENT DOCUMENTS

| | | | |
|---|---|---|---|
| 4,966,501 A | 10/1990 | Nomura et al. | |
| 6,599,062 B1* | 7/2003 | Oles ..................... | B23B 27/145 428/698 |
| 7,939,186 B2* | 5/2011 | Takaoka ................. | C22C 26/00 428/336 |
| 2001/0003569 A1 | 6/2001 | Ota et al. | |
| 2004/0076857 A1* | 4/2004 | Sjolen .................... | B82Y 30/00 428/701 |
| 2007/0148496 A1* | 6/2007 | Takaoka .............. | C23C 14/0641 428/702 |
| 2008/0075543 A1* | 3/2008 | Zhu ........................ | B23B 27/14 407/119 |
| 2010/0135737 A1 | 6/2010 | Fukano et al. | |
| 2011/0014426 A1* | 1/2011 | Ohtomo ................ | B23B 27/141 428/143 |
| 2014/0044946 A1 | 2/2014 | Hirano | |

FOREIGN PATENT DOCUMENTS

| | | | |
|---|---|---|---|
| EP | 1348776 | * | 10/2003 |
| JP | 64-016302 A | | 1/1989 |
| JP | 07-018415 | * | 1/1995 |

(Continued)

OTHER PUBLICATIONS

International Search Report in PCT International Application No. PCT/JP2014/081016, dated Feb. 24, 2014.

(Continued)

*Primary Examiner* — Archene Turner
(74) *Attorney, Agent, or Firm* — Venable LLP; Michael A. Sartori; Miguel A. Lopez

(57) ABSTRACT

A cutting tool includes a base material and a coating formed on the base material. The base material is a sintered body containing 30 to 80% by volume of cubic boron nitride, and a binder. The surface in contact with the coating, of the base material, has a plurality of convex portions made of the cubic boron nitride and a plurality of concave portions made of the binder. A surface roughness Rsub of the surface in contact with the base material, is 0.1 to 0.4 μm. A surface roughness Rsurf of an outermost surface of the coating is 0 to 0.15 μm. A surface roughness Rasurf of the outermost surface of the coating is 0 to 0.1 μm. The surface roughness Rsub of the surface in contact with the coating, of the base material, is greater than the surface roughness Rsurf of the outermost surface of the coating.

5 Claims, No Drawings

(56) References Cited

FOREIGN PATENT DOCUMENTS

| | | |
|---|---|---|
| JP | 2001-220268 A | 8/2001 |
| JP | 2005-279821 A | 10/2005 |
| JP | 2005-279822 A | 10/2005 |
| JP | 2007-283487 A | 11/2007 |
| JP | 2012-157915 A | 8/2012 |
| JP | 2012-157916 A | 8/2012 |
| WO | WO-2007/049785 A1 | 5/2007 |
| WO | WO-2012/144574 A1 | 10/2012 |

OTHER PUBLICATIONS

Decision to Grant Patent in Japanese Patent Application No. 2013-269437, dated Jan. 5, 2016.

* cited by examiner

CUTTING TOOL

TECHNICAL FIELD

The present invention relates to a cutting tool including a base material and a coating formed on the base material.

BACKGROUND ART

Conventionally, attempts have been made to improve the life of a cutting tool that uses a cubic boron nitride sintered body or the like, as the base material. For example, attempts such as those described below have been proposed.

That is, Japanese Patent Laying-Open No. 2001-220268 (PTD 1) discloses reduction of a centerline average surface roughness Ra of a coating surface to 0.2 μm or less by polishing at least either the base material surface or the coating surface.

Japanese Patent Laying-Open No. 2007-283487 (PTD 2) discloses a throw-away insert arranged to have a surface roughness Rz of a honed surface within a range from 0.1Z to 0.5Z.

Japanese Patent Laying-Open No. 2012-157915 (PTD 3) and Japanese Patent Laying-Open No. 2012-157916 (PTD 4) each disclose that concave and convex portions are formed on the base material surface in contact with the coating, and that, by specification of the surface roughnesses of the flank and of the rake face, of the absolute values of the heights of, and the distance between, a concave portion and a convex portion on the base material, and of a magnitude relationship between the surface roughnesses of the flank and the surface roughnesses of the rake face, good adhesion between the base material and the coating is maintained, and adhesion prevention during cutting work and improvement in the quality of worked surface are achieved.

Japanese Patent Laying-Open No. 2005-279821 (PTD 5) and Japanese Patent Laying-Open No. 2005-279822 (PTD 6) each disclose that a magnitude relationship between the surface roughnesses of the flank and of the rake face is specified, and thus chipping is reduced while the wear resistance is maintained.

CITATIONS LIST

Patent Document

PTD 1: Japanese Patent Laying-Open No. 2001-220268
PTD 2: Japanese Patent Laying-Open No. 2007-283487
PTD 3: Japanese Patent Laying-Open No. 2012-157915
PTD 4: Japanese Patent Laying-Open No. 2012-157916
PTD 5: Japanese Patent Laying-Open No. 2005-279821
PTD 6: Japanese Patent Laying-Open No. 2005-279822

SUMMARY OF INVENTION

Technical Problem

With regard to PTD 1, specification of Ra as 0.2 μm or below, and polishing at least either the base material or the coating is insufficient in high efficiency machining that imposes a high load on the coating, and thus chipping and/or peeling may occur due to occurrence of melting and adhering on the surface.

With regard to PTD 2, the surface roughness of a base material of a cutting tool without coating is specified to reduce melting and adhering. However, in particular for improving wear resistance during high-efficiency machining, a coating having higher heat resistance than that of a cubic boron nitride sintered body is required, and thus only specifying the surface roughness of the base material is insufficient for extending the life thereof.

With regard to PTDs 3 and 4, the cubic boron nitride sintered body is less likely to achieve a good adhesive force with the coating, and thus the advantageous effect may be insufficient under stringent cutting conditions, such as carburized layer removal and a high-feed cutting condition in hardened steel cutting in recent years, depending on the specification of the concave and convex portions on the base material. In addition, specifying only the surface roughness of the base material does not ensure sufficient smoothness of the coating surface, and cannot completely prevent an increase of melting and adhering on the negative land face and on the flank since the thrust force component of the cutting resistance is higher than the principal force component thereof for hardened steel.

With regard to PTDs 5 and 6, no tool is considered which includes a cubic boron nitride sintered body as the base material, and a coating having lower hardness than the base material formed thereon. In particular, a cubic boron nitride sintered body is less likely to achieve a good adhesive force with the coating, and the total film thickness of the coating is low. Therefore, a sufficient advantageous effect cannot be provided for a tool of a coated cubic boron nitride sintered body.

The present invention has been made to solve the problems described above, and an object thereof is to provide a long-life cutting tool that permits stable machining even under high load and high efficiency cutting conditions.

Solution to Problem

A cutting tool according to the present invention is a cutting tool including a base material and a coating formed on the base material. The base material is a sintered body containing 30 to 80% by volume of cubic boron nitride, and a binder. The binder contains at least one compound formed of at least one element selected from the group consisting of group IV elements (Ti, Zr, Hf), group V elements (V, Nb, Ta), and group VI elements (Cr, Mo, W) of Periodic Table, and aluminum, and at least one element selected from the group consisting of boron, carbon, nitrogen, and oxygen. A surface in contact with the coating, of the base material, has a plurality of convex portions made of the cubic boron nitride, and a plurality of concave portions made of the binder. The coating includes at least one layer having a composition of $M1_xL1_y$ (where x and y represent an atom ratio ($0 < x \leq 1.2$ and $y=1$); M1 is at least one element selected from the group consisting of group IV elements, group V elements, and group VI elements of Periodic Table, aluminum, and silicon; and L1 is at least one element selected from the group consisting of boron, carbon, nitrogen, and oxygen). A surface roughness Rsub of the surface in contact with the coating, of the base material, is 0.1 to 0.4 μm. A surface roughness Rsurf of an outermost surface of the coating is 0 to 0.15 μm. A surface roughness Rasurf of the outermost surface of the coating is 0 to 0.1 μm. The surface roughness Rsub of the surface in contact with the coating, of the base material, is greater than the surface roughness Rsurf of the outermost surface of the coating.

Advantageous Effects of Invention

Having the configuration described above, a cutting tool of the present invention has a long life, and permits stable machining even under high load and high efficiency cutting conditions.

DESCRIPTION OF EMBODIMENTS

Description of Embodiment of Present Invention

First, an embodiment of the present invention (hereinafter also referred to as "this embodiment") will be outlined with the points (1) to (4) listed below.

(1) A cutting tool according to this embodiment is a cutting tool including a base material and a coating formed on the base material. The base material is a sintered body containing 30 to 80% by volume of cubic boron nitride and a binder. The binder contains at least one compound formed of at least one element selected from the group consisting of group IV elements, group V elements, and group VI elements of Periodic Table, and aluminum, and at least one element selected from the group consisting of boron, carbon, nitrogen, and oxygen. A surface in contact with the coating, of the base material, has a plurality of convex portions made of the cubic boron nitride, and a plurality of concave portions made of the binder. The coating includes at least one layer having a composition of $M1_xL1_y$ (where x and y represent an atom ratio ($0<x\leq1.2$ and $y=1$); M1 is at least one element selected from the group consisting of group IV elements, group V elements, and group VI elements of Periodic Table, aluminum, and silicon; and L1 is at least one element selected from the group consisting of boron, carbon, nitrogen, and oxygen). A surface roughness Rsub of the surface in contact with the coating, of the base material, is 0.1 to 0.4 μm. A surface roughness Rsurf of an outermost surface of the coating is 0 to 0.15 μm. A surface roughness Rasurf of the outermost surface of the coating is 0 to 0.1 μm. The surface roughness Rsub of the surface in contact with the coating, of the base material is greater than the surface roughness Rsurf of the outermost surface of the coating.

Having the configuration described above, a cutting tool according to this embodiment can have a long life, and permit stable machining even under high load and high efficiency cutting conditions.

Here, the surface roughness R of the surface in contact with the coating, of the base material, measured by means of a scanning electron microscope is represented as Rsub. The surface roughness R of the outermost surface of the coating, measured by means of a scanning electron microscope, is represented as Rsurf. The surface roughness Ra of the outermost surface of the coating, measured by means of a stylus profilometer, is represented as Rasurf.

A surface roughness R measured by means of a scanning electron microscope is defined as follows. That is, first, a backscattered electron image of an edge fracture surface of the cutting tool observed using a scanning electron microscope at a magnification of 2000 is magnified 2.5 times. Next, a 50 μm square area is selected including a boundary between the base material and the coating and a boundary of the outermost surface of the coating, and both boundaries are each traced with a line that is 0.3 mm wide or less, and are then extracted. These lines are digitized using image processing software (e.g., one having a trademark "Winroof," product of MITANI CORPORATION) to calculate respective averages, and average lines are drawn in a horizontal direction. Then, the average lines are each defined as the X-axis, and a line perpendicular thereto is defined as the Y-axis. The Y value is then integrated along the X-direction (over 50 μm), and the resultant value is divided by 50 μm. The value calculated is the surface roughness R. Note that an edge fracture surface mentioned above denotes a cross section including the rake face, the flank, and the negative land face of the base material and of the coating, taken along a plane including a normal with respect to the rake face near where the tool is used for cutting.

Meanwhile, a surface roughness Ra measured by means of a stylus profilometer is the arithmetic average roughness defined in JIS B 0601-2001 standard when a 400 μm square area of a surface of the coating on the rake face and on the flank near where the tool is used for cutting is measured by means of a stylus profilometer.

(2) The thickness of the coating is preferably 0.2 to 10 μm. This permits wear resistance and peel-off resistance to be further improved. Here, a 50 μm square area in the backscattered electron image of an edge fracture surface of the cutting tool observed using a scanning electron microscope at a magnification of 2000 is selected, and the length of a line extending, along a vertical direction, from a concave portion of the base material in the selected area to the coating surface is defined as the thickness of the coating.

(3) The surface roughness Rsub of the surface in contact with the coating, of the base material, is preferably 0.1 to 0.15 μm. The surface roughness Rsurf of the outermost surface of the coating is preferably 0 to 0.08 μm. A coarser surface of the base material and a smoother surface of the coating in such manner permits fracture resistance and peel-off resistance to be further improved.

(4) The sintered body preferably contains 65 to 75% by volume of cubic boron nitride. This permits fracture resistance to be further improved.

Details of Embodiment of Invention

A cutting tool according to this embodiment will be described below in detail. However, it should be understood that the present invention is not limited thereto.

<Cutting Tool>

A cutting tool according to this embodiment is configured to include a base material and a coating formed on the base material. It is preferable that such coating cover the entire surface of the base material. However, even if a portion of the base material is not covered with this coating, or the configuration of the coating partly differs, such configuration would not depart from the scope of the present invention.

Examples of such cutting tool according to this embodiment are, for example, drills, end mills, indexable cutting inserts for drills, indexable cutting inserts for end mills, indexable cutting inserts for milling, indexable cutting inserts for turning, metal saws, gear cutting tools, reamers, taps, and pin milling cutting inserts for crankshafts.

In addition, a cutting tool according to this embodiment is not limited only to one configured as described above such that the entire tool includes a base material and a coating formed on the base material, but may also include one that only a portion (in particular, edge region (cutting edge portion) or the like) of the tool is configured to have the configuration described above. For example, one configured such that only an edge region of the base body (support) made of cemented carbide or the like has the configuration described above is also included in a cutting tool according to this embodiment. Note that, in this case, such edge region should be terminologically regarded as a cutting tool. In other words, even when the configuration described above is implemented only in a portion of the cutting tool, the portion having the configuration described above should be designated as a cutting tool.

<Base Material>

The base material according to this embodiment is a sintered body that contains 30 to 80% by volume of cubic boron nitride and a binder. The sintered body according to this embodiment may contain other component as long as the two components described above are contained. The sintered body may also contain incidental impurities resulting from raw material used, from manufacturing conditions, and/or the like.

The cubic boron nitride contained in the sintered body according to this embodiment has high hardness itself, and is thus advantageous in machining hardened steel having high hardness. A content less than 30% by volume of this cubic boron nitride results in insufficient fracture resistance, and a content more than 80% by volume, meaning a relative decrease in the ratio of the binder, results in insufficient heat resistance and decreased wear resistance. In view of necessary fracture resistance for hardened steel machining that is becoming more highly efficient in recent years, a content of 65 to 75% by volume of the cubic boron nitride is particularly preferred.

Note that such content (% by volume) can be achieved by selecting the percentage by volume of cubic boron nitride powder that is used during sintered body production within the range described above, and can be verified by quantitative analysis of the sintered body by means of inductively coupled radio frequency plasma spectroscopy (ICP), or by texture observation, elemental analysis, or the like, by using a scanning electron microscope (SEM) or a transmission electron microscope (TEM). Specifically, the content of the cubic boron nitride can be verified by observing the texture of the sintered body using an SEM, distinguishing the cubic boron nitride and the binder based on the contrast difference, and calculating the area ratio by means of image analysis, regarding the area ratio as the percentage by volume. This can obtain, at the same time, the percentage by volume of the binder described below.

The binder contained in the sintered body according to this embodiment contains at least one compound formed of at least one element selected from the group consisting of group IV elements, group V elements, and group VI elements of Periodic Table, and aluminum, and at least one element selected from the group consisting of boron, carbon, nitrogen, and oxygen. This can achieve good fracture resistance in machining hardened steel having high hardness.

Such binder can be, for example, TiN, $TiB_2$, ZrN, HfN, TiAlN (TiNAl), TiAlCN (TiCNAl), $Al_2O_3$, AlN, $AlB_2$, or the like.

Note that when a compound is expressed herein using a chemical formula as described above, a chemical formula that shows no specific limitation on an atom ratio is intended to include any atom ratio heretofore known, and is not intended to limit to those within that stoichiometric range. For example, a simply-expressed formula "TiN" does not limit the atom ratio between "Ti" and "N" to 50:50, nor does a formula "ZrN" limit the atom ratio between "Zr" and "N" to 50:50, but those formulae are intended to include any atom ratio heretofore known.

<Coating>

The coating according to this embodiment includes at least one layer having a composition of $M1_xL1_y$ (where x and y represent an atom ratio ($0<x \leq 1.2$ and $y=1$); M1 is at least one element selected from the group consisting of group IV elements, group V elements, and group VI elements of Periodic Table, aluminum, and silicon; and L1 is at least one element selected from the group consisting of boron, carbon, nitrogen, and oxygen). This can achieve good wear resistance in high load and high efficiency machining of hardened steel.

The layer described above can be one made of, for example, TiAlN, TiCN, AlCrN, Ti, TiSiN, TiNbCN, AlCrSiN, AlVCrN, TiSiCN, TiAlWN, or the like.

Note that, as long as the layer described above is included, any other layer may as well be included.

Preferably, such a coating according to this embodiment has a thickness of 0.2 to 10 μm. A thickness less than 0.2 μm may result in insufficient wear resistance, and a thickness more than 10 μm causes the coating itself to exhibit a tendency to more easily be peeled off. The thickness of the coating is more preferably 1 to 5 μm.

<Surface Roughness>

In this embodiment, the surface roughness Rsub of the surface in contact with the coating, of the base material is 0.1 to 0.4 μm; the surface roughness Rsurf of the outermost surface of the coating is 0 to 0.15 μm; and the surface roughness Rasurf of the outermost surface of the coating is 0 to 0.1 μm. In addition, the surface roughness Rsub of the surface in contact with the coating, of the base material, is greater than the surface roughness Rsurf of the outermost surface of the coating. As described above, configuring such that the surface roughness Rsub of the surface of the base material is greater than the surface roughness Rsurf of the outermost surface of the coating (i.e., the surface of the base material is coarser) permits the adhesive force between the base material and the coating to be increased due to the anchoring effect. Moreover, configuring such that the surface roughness Rsurf of the outermost surface of the coating is less than the surface roughness Rsub of the surface of the base material (i.e., the coating surface is smoother) permits fracture resistance and peel-off resistance to be improved.

A surface roughness Rsub of the surface in contact with the coating, of the base material, less than 0.1 μm is unlikely to provide a good anchoring effect, thereby reducing the adhesive force of the coating to fail to achieve performance, and one greater than 0.4 μm results in too large a surface roughness that will be reflected on the coating surface, and thus makes it difficult to reduce the surface roughness. In addition, a surface roughness Rsurf of the outermost surface of the coating greater than 0.15 μm causes melting and adhering to occur in concave and convex portions, and thus peeling and/or chipping to occur more easily from convex portions. Moreover, a surface roughness Rasurf of the outermost surface of the coating greater than 0.1 μm similarly causes melting and adhering to occur in concave and convex portions, and thus peeling and/or chipping to occur more easily from convex portions. The surface roughness Rsub of the surface in contact with the coating, of the base material, is more preferably 0.1 to 0.15 μm. The surface roughness Rsurf of the outermost surface oft the coating is more preferably 0 to 0.08 μm. The surface roughness Rasurf of the outermost surface of the coating is more preferably 0 to 0.06 μm.

In this embodiment, the surface in contact with the coating, of the base material, has a plurality of convex portions made of the cubic boron nitride, and a plurality of concave portions made of the binder. As used herein, the phrase "a plurality of" is intended to exclude a case in which only one such convex portion and only one such concave portion are provided, and is not intended to represent any specific number thereof. For example, a surface that includes ten convex portions and ten concave portions per 10 µm² of that surface is included. The surface conditions of the coating outermost surface usually include concave and convex portions that reflect the surface conditions of the base material. Therefore, when the coating surface is polished, convex portions of the coating surface corresponding to convex portions of the base material surface are first smoothed, and accordingly, the portions of the coating over the cubic boron nitride become thinner than the other portions (i.e., the portions over the binder). This causes the film thickness over the cubic boron nitride, which has lower adhesive force with the coating than the binder, to be selectively lower, and thus permits peel-off resistance to be improved.

Moreover, earlier growth of crystal grains of the coating in a portion over a convex portion of the base material on the coating surface side results in larger crystal grain sizes, while crystal grain sizes of the coating are smaller in a portion over a concave portion of the base material than those over a convex portion of the base material. Such non-uniformity of the crystal grain size reduces crack propagation. Such an effect is advantageous in extending the life due to chipping reduction, while chippings of the coating are accumulated particularly in high efficiency cutting in which chipping easily occurs, and then creates a defect in the base material, thereby reducing the life.

Furthermore, earlier growth of crystal grains of the coating in a portion over a convex portion of the base material, i.e., of the coating in a portion over the cubic boron nitride, on the coating surface side, results in a higher occupancy rate of the coating over the cubic boron nitride toward the coating surface, and a higher occupancy rate of the coating over the binder toward the base material. In addition, since the binding force between crystals of the coating over the cubic boron nitride is larger than the binding force between crystals of the coating over the binder, formed of different compounds and/or formed in different sizes, the strength of the coating surface is increased. This permits machining with a higher strength coating in an initial stage of cutting than in a last stage of cutting. A chipping reduction effect is achieved particularly in a cutting process that imposes a high load in an initial stage of cutting, such as carburized layer removal. Moreover, high adhesive force between the binder and the coating permits peel-off resistance to be maintained until the last stage of cutting.

A cutting tool according to this embodiment preferably has a surface roughness Rsurf of the coating outermost surface less than or equal to 0.06 µm in the portion from the ridge line to the flank. When the work material has low hardness, melting and adhering frequently occurs particularly on the ridge line and on the flank in a last stage of cutting during carburized layer removal. However, a surface roughness less than or equal to 0.06 µm in the portion from ridge line to the flank permits melting and adhering to be less likely to occur, and thus adhesion resistance to be improved.

A cutting tool according to this embodiment preferably has a surface roughness Rsurf of the coating outermost surface less than or equal to 0.06 µm in the portion from the ridge line to the negative land face. Cutting of hardened steel imposes a higher thrust force component in the cutting resistance. Accordingly, a surface roughness less than or equal to 0.06 µm in the portion from the ridge line to the negative land face permits chipping resistance and peel-off resistance to be further improved.

In this embodiment, the ridge line means the portion of intersection point on the edge between the negative land face and the flank. The negative land face means the chamfer provided, by polishing, in the portion of intersection point on the edge between the rake face and the flank.

In this embodiment, the specifications of the surface roughnesses described above may be met over the entire base material, or may be met only on a portion of the base material unless any site is specifically specified Note that, when such specifications are met only on a portion of the base material, and such portion is the flank, these specifications provide an advantage of reducing melting and adhering on the flank, which occurs more frequently particularly when the work has a low hardness, and of reducing peeling of the coating. Alternatively, when such specifications are met only on a portion of the base material, and such portion is the rake face, these specifications provide an advantage of reducing film peeling and/or flaking on the rake face side that occurs when the thrust force component is large.

<Manufacture Method>

The base material according to this embodiment can be obtained by a heretofore known method of manufacturing such as ultra-high pressure sintering. Performing an ion bombardment process on the base material obtained then causes the binder to be selectively etched rather than cubic boron nitride, and thus the cubic boron nitride projects out to form convex portions on the base material surface, and concave portions are formed in the binder. Thereafter, the coating is formed over the base material with adoption of heretofore known conditions. Then, the coating surface is polished to achieve the outermost surface of the coating that is smoother than the base material.

A cutting tool according to this embodiment can be manufactured as described above.

Here, when only a portion of the tool is configured to have the configuration of this embodiment (for example, only an edge region of the base body made of cemented carbide, or the like, is configured to have the configuration of this embodiment), such cutting tool can be manufactured as follows.

First, the base body made of cemented carbide can be manufactured by sintering and molding techniques heretofore known. Then, a component having the configuration of this embodiment described above is joined to an appropriate site of the base body by means of a known joining technique by using a known wax material, thereby to form a cutting tool.

Examples

This embodiment will be described below in more detail with examples. However, this embodiment is not limited thereto.

<Manufacture of Base Material>

Base materials A to V having the compositions shown in Table 1 were manufactured as follows.

TABLE 1

| | Cubic Boron Nitride Content [% by volume] | Average Grain Size [µm] | Binder |
|---|---|---|---|
| Base Material A | 25 | 2 | $TiN_{0.6}Al$ |
| Base Material B | 30 | 2 | $TiN_{0.6}Al$ |
| Base Material C | 40 | 2 | $TiN_{0.6}Al$ |
| Base Material D | 55 | 3 | $TiN_{0.6}Al$ |
| Base Material E | 65 | 2 | $TiN_{0.6}Al$ |
| Base Material F | 75 | 3 | $TiN_{0.6}Al$ |
| Base Material G | 80 | 3 | $TiN_{0.6}Al$ |
| Base Material H | 90 | 2 | $TiN_{0.6}Al$ |

TABLE 1-continued

| | Cubic Boron Nitride Content [% by volume] | Average Grain Size [μm] | Binder |
|---|---|---|---|
| Base Material I | 70 | 0.5 | $TiN_{0.6}Al$ |
| Base Material J | 70 | 6 | $TiN_{0.6}Al$ |
| Base Material K | 55 | 2 | $TiN_{0.6}Al$ |
| Base Material L | 55 | 2 | $TiN_{0.6}Al$ |
| Base Material M | 55 | 2 | $TiN_{0.6}Al$ |
| Base Material N | 55 | 2 | $TiN_{0.6}Al$ |
| Base Material O | 55 | 2 | $TiN_{0.6}Al$ |
| Base Material P | 55 | 2 | $TiN_{0.6}Al$ |
| Base Material Q | 70 | 3 | $TiN_{0.6}Al$ |
| Base Material R | 70 | 3 | $TiN_{0.6}Al$ |
| Base Material S | 70 | 3 | $TiN_{0.6}Al$ |
| Base Material T | 55 | 1.5 | $TiC_{0.3}N_{0.3}Al$ |
| Base Material U | 55 | 1.5 | $TiC_{0.3}N_{0.3}Al$ |
| Base Material V | 55 | 1.5 | $TiC_{0.3}N_{0.3}Al$ |

(Manufacture of Base Material A)

First, TiN powder having an average grain size of 1 gun and Ti powder having an average grain size of 3 μm were mixed to achieve an atom ratio of Ti:N=1:0.6 to obtain a mixture. This mixture was subjected to thermal treatment at 1200° C. in vacuum for 30 minutes, and was then ground to obtain intermetallic compound powder made of $TiN_{0.6}$.

Next, the intermetallic compound powder made of $TiN_{0.6}$ and Al powder having an average grain size of 4 μm were mixed to achieve a mass ratio of $TiN_{0.6}$:Al=90:10 to obtain a mixture. This mixture was subjected to thermal treatment at 1000° C. in vacuum for 30 minutes. The compound obtained by thermal treatment was uniformly ground by ball mill grinding using ball media made of cemented carbide of 6 mm diameter to obtain raw material powder of the binder.

Then, cubic boron nitride grains having an average grain size of 2 μm and the raw material powder of the binder were blended together so that the content of the cubic boron nitride grains in the base material would be 25% by volume, and were then uniformly mixed by ball mill mixing using ball media made of boron nitride of 3 mm of diameter to obtain a mixture in powder form. This mixture was then stacked on a support substrate made of cemented carbide, and was then encapsulated into a capsule made of Mo. Next, the resultant was sintered under a pressure of 5.5 GPa at a temperature of 1300° C. for 30 minutes using an ultra-high pressure apparatus to obtain base material A.

(Manufacture of Base Materials B to S)

Base materials B to S were obtained in a similar manner to base material A except that different volume contents and average grain sizes of the cubic boron nitride grains were used as shown in Table 1.

(Manufacture of Base Materials T to V)

First, TiCN powder having an average grain size of 1 μm and Ti powder having an average grain size of 3 μm were mixed to achieve an atom ratio of Ti:C:N=1:0.3:0.3 to obtain a mixture. This mixture was subjected to thermal treatment at 1200° C. in vacuum for 30 minutes, and was then ground to obtain intermetallic compound powder made of $TiC_{0.3}N_{0.3}$.

Next, the intermetallic compound made of $TiC_{0.3}N_{0.3}$ and Al powder having an average grain size of 4 μm were mixed to achieve a mass ratio of $TiC_{0.3}N_{0.3}$:Al=95:5 to obtain a mixture. This mixture was subjected to thermal treatment at 1000° C. in vacuum for 30 minutes. The compound obtained by thermal treatment was uniformly ground by ball mill grinding using ball media made of cemented carbide of 6 mm diameter to obtain raw material powder of the binder.

Then, using the raw material powder of the binder, base materials T to V were obtained in a similar manner to base material A except that different volume contents and average grain sizes of the cubic boron nitride grains were used as shown in Table 1.

<Sample Production>

(Base Body Formation)

A base body having a shape of an ISO standard DNGA150408, and made of a cemented carbide material (K10 grade), was prepared. The base material described above (shape: triangular prism having a base of an isosceles triangle whose apex angle was 55°, and whose two sides including the apex angle were 2 mm long each, and having a thickness of 2 mm) was joined to the edge (corner portion) of that base body. Junction was made using wax material made of Ti—Zr—Cu. Next, a negative land form (negative land width 150 μm, negative land angle 25°) was formed at an edge portion by grinding the outer peripheral, upper, and lower surfaces of the joined body. Thus, base bodies respectively having edge (cutting edge) portions formed of base materials A to V were obtained.

(Film Forming Apparatus)

A film forming apparatus for use in forming the coating in the subsequent processes will now be described. The film forming apparatus is connected with a vacuum pump, and has a vacuum chamber in which a vacuum can be drawn. The vacuum chamber is provided therein with a rotary table, which is configured such that a base body can be placed thereon with the help of a jig. The base body placed in the vacuum chamber can be heated by a heater provided in the vacuum chamber. In addition, the vacuum chamber is connected with a gas pipe for introducing gas for etching and for film formation through a mass flow controller (MFC) for controlling the flow rate. Also, in the vacuum chamber, a tungsten filament for generating Ar ion for etching, and an arc evaporation source or a sputtering source for film formation connected with a necessary power source are disposed. Evaporation source raw material (target) needed for film formation is placed in the arc evaporation source or the sputtering source.

(Ion Bombardment Process)

The base body obtained as described above was placed in the vacuum chamber of the film forming apparatus, and a vacuum was drawn in the chamber, after which the base body was heated to 500° C. with the rotary table being rotated at 3 rpm. Next, after Ar gas was introduced into the vacuum chamber, the tungsten filament was allowed to discharge to generate Ar ion. Then, a bias voltage was applied to the base body to perform ion bombardment process on the base body by means of Ar ion. Note that the conditions of this ion bombardment process are as follows, and the process times were controlled so that the values of the surface roughness Rsub of the surface in contact with the coating, of the base material, listed in Table 2 were achieved. The longer the ion bombardment time is, the greater becomes the Rsub.

Ar gas pressure: 1 Pa

Substrate bias voltage: −600 V

Process time: 10 to 45 minutes

In this manner, the cubic boron nitride formed the convex portions, while the binder formed the concave portions, and the surface roughnesses Rsub of the surfaces in contact with the coatings, of the base materials, were achieved as shown in Table 2.

TABLE 2

| | | Surface Roughness of Surface in Contact with Coating of Base Material Rsub [μm] | Coating Composition | Coating Thickness [μm] | Surface Roughness of Outermost Surface of Coating Rasurf [μm] | Surface Roughness of Outermost Surface of Coating Rsurf [μm] |
|---|---|---|---|---|---|---|
| Sample 1 | Base Material A | 0.15 | TiAlN | 3 | 0.06 | 0.07 |
| Sample 2 | Base Material B | 0.16 | TiAlN | 3 | 0.06 | 0.07 |
| Sample 3 | Base Material C | 0.15 | TiAlN | 3 | 0.06 | 0.07 |
| Sample 4 | Base Material D | 0.16 | TiAlN | 3 | 0.06 | 0.07 |
| Sample 5 | Base Material E | 0.16 | TiAlN | 3 | 0.06 | 0.07 |
| Sample 6 | Base Material F | 0.15 | TiAlN | 3 | 0.06 | 0.07 |
| Sample 7 | Base Material G | 0.15 | TiAlN | 3 | 0.06 | 0.07 |
| Sample 8 | Base Material H | 0.16 | TiAlN | 3 | 0.06 | 0.07 |
| Sample 9 | Base Material I | 0.16 | TiAlN/TiCN | 2 | 0.07 | 0.08 |
| Sample 10 | Base Material J | 0.18 | Repetition of (AlCrN/TiN/TiCN/TiN) | 2.5 | 0.07 | 0.08 |
| Sample 11 | Base Material K | 0.17 | AlCrN/TiSiN/TiN/TiCN | 2.5 | 0.07 | 0.08 |
| Sample 12 | Base Material L | 0.17 | TiAlN/TiCN | 2.5 | 0.07 | 0.08 |
| Sample 13 | Base Material M | 0.17 | TiAlN/TiCN | 5 | 0.07 | 0.08 |
| Sample 14 | Base Material N | 0.17 | TiAlN/TiCN | 11 | 0.07 | 0.08 |
| Sample 15 | Base Material O | 0.17 | TiAlN/TiCN | 0.2 | 0.07 | 0.08 |
| Sample 16 | Base Material P | 0.17 | None | 0 | — | — |
| Sample 17 | Base Material Q | 0.18 | TiAlN | 2.5 | 0.12 | 0.16 |
| Sample 18 | Base Material R | 0.18 | TiAlN | 2.5 | 0.06 | 0.08 |
| Sample 19 | Base Material S | 0.18 | TiAlN | 2.5 | 0.04 | 0.06 |
| Sample 20 | Base Material T | 0.1 | TiAlN | 2.5 | 0.04 | 0.06 |
| Sample 21 | Base Material U | 0.16 | TiAlN | 2.5 | 0.1 | 0.14 |
| Sample 22 | Base Material V | 0.04 | TiAlN | 2.5 | 0.08 | 0.1 |

(Production of Samples 1 to 8 and 17 to 22)

After ion bombardment processes were performed on base materials A to H and Q to V as described above, a TiAlN layer was formed over each of base materials A to H and Q to V. More specifically, first, the TiAlN layers were formed under the conditions described below by controlling the deposition time to achieve the thicknesses shown in Table 2.

Target: Al and Ti
Introduced gas: $N_2$
Film forming pressure: 4 Pa
Arc discharge current: 150 A
Substrate bias voltage: −35 V
Table rotation speed: 3 rpm.

Next, diamond loose abrasive of #2000 grade was applied onto the surface of a rotating brush, and the coating surface obtained was then polished by pushing the brush onto the coating surface with the process time being controlled so that the surface roughnesses (Rsurf and Rasurf) of the outermost surface of the coating shown in Table 2 were achieved.

In this manner, samples 1 to 8 and 17 to 22 were obtained with the TiAlN layers being stacked respectively over base materials A to 1H and Q to V.

(Production of Samples 9 and 12 to 15)

After ion bombardment processes were performed on base materials I and L to O as described above, a TiAlN and a TiCN layers were formed over each of base materials I and L to O. More specifically, first, the TiAlN and TiCN layers were formed under the conditions described below by controlling the deposition time to achieve the total thicknesses shown in Table 2.

1) Conditions for Forming TiAlN Layer
Target: Al and Ti
Introduced gas: $N_2$
Film forming pressure: 4 Pa
Arc discharge current: 150 A
Substrate bias voltage: −35 V
Table rotation speed: 3 rpm.

2) Conditions for Forming TiCN Layer
Target: Ti
Introduced gas: $N_2$ and $CH_4$
Film forming pressure: 2 Pa
Arc discharge current: 180 A
Substrate bias voltage: −350 V
Table rotation speed: 3 rpm.

Next, the coating surface obtained was polished under conditions where an elastic polishing media that uses diamond abrasive grains with dry blasting was adjusted to provide an injection angle of 15 to 70 degrees at an injection distance of 100 mm with respect to the surface to be worked (rake face, flank, or negative land face), and then the blast was propelled for 30 seconds so that the surface roughnesses (Rsurf and Rasurf) of the outermost surface of the coating shown in Table 2 were achieved. A large injection angle with respect to the surface to be worked serves to remove the coating rather than to reduce irregularities of the coating surface to reduce the surface roughness. This prevents the effects of the coating from being provided. A small injection angle prevents the polishing effects of the elastic polishing media from being provided, and thus the surface roughnesses cannot be reduced.

In this manner, samples 9 and 12 to 15 were obtained with the TiAlN and TiCN layers being stacked in this order respectively over base materials I and L to O.

(Production of Sample 10)

After ion bombardment process was performed on base material J as described above, an AlCrN layer, a TiN layer, a TiCN layer, and a TiN layer were formed repeatedly over base material J. More specifically, first, the AlCrN layer, the TiN layer, the TiCN layer, and the TiN layer were formed repeatedly in this order under the conditions described below by controlling the deposition time to achieve the total thickness shown in Table 2.

1) Conditions for Forming AlCrN Layer
Target: Al and Cr
Introduced gas: $N_2$
Film forming pressure: 3 Pa
Arc discharge current: 150 A
Substrate bias voltage: −50 V.

2) Conditions for Forming TiN Layer
Target: Ti
Introduced gas: $N_2$
Film forming pressure: 3 Pa
Arc discharge current: 150 A
Substrate bias voltage: −40 V.

3) Conditions for Forming TiCN
Target: Ti
Introduced gas: $N_2$ and $CH_4$
Film forming pressure: 2 Pa
Arc discharge current: 180 A
Substrate bias voltage: −350 V
Table rotation speed: 3 rpm.

Next, the coating surface obtained was polished using a lapping technique in which polishing was performed by softly rubbing for 10 seconds with a grinding stone having abrasive grains being dispersed on a rubber member so that the surface roughnesses (Rsurf and Rasurf) of the outermost surface of the coating shown in Table 2 were achieved.

In this manner, sample 10 was obtained by stacking, over base material J, three repetitions of the AlCrN layer, the TiN layer, the TiCN layer, and the TiN layer repeatedly in this order.

(Production of Sample 11)

After ion bombardment process was performed on base material K as described above, an AlCrN layer, a TiSiN layer, a TiN layer, and a TiCN layer were formed over the base material K More specifically, first, the AlCrN layer, the TiSiN layer, the TiN layer, and the TiCN layer were formed under the conditions described below by controlling the deposition time to achieve the total thickness and the outermost surface roughness of the coating shown in Table 2.

1) Conditions for Forming AlCrN Layer
Target: Al and Cr
Introduced gas: $N_2$
Film forming pressure: 3 Pa
Arc discharge current: 150 A
Substrate bias voltage: −50 V.

2) Conditions for Forming TiSiN Layer
Target: Ti and Si
Introduced gas: $N_2$
Film forming pressure: 3 Pa
Arc discharge current: 150 A
Substrate bias voltage: −40 V.

3) Conditions for Forming TiN Layer
Target: Ti
Introduced gas: $N_2$
Film forming pressure: 3 Pa
Arc discharge current: 150 A
Substrate bias voltage: −40 V.

4) Conditions for Forming TiCN Layer
Target: Ti
Introduced gas: $N_2$ and $CH_4$
Film forming pressure: 2 Pa
Arc discharge current: 180 A
Substrate bias voltage: −350 V
Table rotation speed: 3 rpm.

Next, the coating surface obtained was polished using a lapping technique in which polishing was performed by softly rubbing for 10 seconds with a grinding stone having abrasive grains being dispersed on a rubber member so that the surface roughnesses (Rsurf and Rasurf) of the outermost surface of the coating shown in Table 2 were achieved.

In this manner, sample 11 was obtained with the AlCrN layer, the TiSiN layer, the TiN layer, and the TiCN layer being stacked in this order over base material K.

(Production of Sample 16)

After ion bombardment process was performed on base material P as described above, no coating was formed over base material P. In this manner, sample 16 was obtained with no coating being formed over base material P.

<Measurement of Surface Roughness>

The surface roughnesses Rsub, Rsurf, and Rasurf were measured using the method described above.

<Evaluation>

The lives of the cutting tools relating to samples 1 to 22 obtained as described above were evaluated by cutting of carburized material.

(Cutting Conditions)

Work material: carburized material (surface HRC60) machined into a shape of φ100×300 mm (the thickness of a carburized layer is typically about 1 mm, and HRC below that layer is 30 to 50. Machining was performed on a portion from the carburized layer to an interior having decreased hardness.)

Cutting speed; 100 m/min
Feed: f=0.15 mm/rev
Depth of cut: ap=0.5 mm
Cutting oil: 20-fold dilution of emulsion (trademark "System Cut 96," product of Japan Fluid Power System Society) (wet condition).

<Measurement of Life>

The life was defined as the cutting time needed for a damage width to exceed 0.1 mm. Here, the time when at least one of the amount of wear on the flank, the amount of fracture, or the amount of peel off exceeds 0.1 mm is deemed as the life. The life measurement results of samples 1 to 22 are shown in Table 3.

TABLE 3

|  | Life (min) |
| --- | --- |
| Sample 1 | 1.2 |
| Sample 2 | 6 |
| Sample 3 | 7 |
| Sample 4 | 10 |
| Sample 5 | 11 |
| Sample 6 | 15 |
| Sample 7 | 1.5 |
| Sample 8 | 0.3 |
| Sample 9 | 3 |
| Sample 10 | 3 |
| Sample 11 | 6 |
| Sample 12 | 10 |
| Sample 13 | 1.5 |
| Sample 14 | 0.2 |
| Sample 15 | 1.4 |
| Sample 16 | 1.2 |
| Sample 17 | 1.4 |
| Sample 18 | 6 |
| Sample 19 | 12 |
| Sample 20 | 10 |
| Sample 21 | 4 |
| Sample 22 | 0.2 |

<Result and Discussion>

(Content of Cubic Boron Nitride)

In evaluation of samples 1 to 8, a tendency to exhibit long lives was verified in samples 2 to 7 each having a content of cubic boron nitride of 30 to 80% by volume. Thus, preference for a content of cubic boron nitride of 30 to 80% by volume was verified. In addition, a tendency to exhibit particularly long lives was verified in samples 5 and 6 each having a content of cubic boron nitride of 65 to 75% by volume. Thus, it is particularly preferred that the content of cubic boron nitride be 65 to 75% by volume.

As is obvious from the results described above, samples 2 to 7 are examples, while samples 1 and 8 are comparative examples.

(Relationship Between Surface Roughness Rsub of Surface in Contact with Coating, of Base Material, and Surface Roughness Rsurf of Outermost Surface of Coating)

In evaluation of samples 20 to 22, samples 20 to 21 each having a surface roughness of the surface in contact with the coating, of the base material, of 0.1 to 0.4 µm exhibited a tendency to have longer lives than sample 22 having a surface roughness of the surface in contact with the coating, of the base material, less than 0.1 µm. Thus, preference for a surface roughness Rsub in contact with the coating, of the base material, of 0.1 to 0.4 µm could be verified.

Meanwhile, in evaluation of samples 20 to 22, samples 20 and 21 each having a surface roughness of the surface in contact with the coating, of the base material, greater than the surface roughness of the outermost surface of the coating, exhibited a tendency to have longer lives than sample 22 that does not satisfy such condition. Thus, verification could be made that it is preferable that the surface roughness of the surface in contact with the coating, of the base material, be greater than the surface roughness of the outermost surface of the coating.

As is obvious from the results described above, samples 20 and 21 are examples, while sample 22 is a comparative example.

(Surface Roughness Rsurf of Outermost Surface of Coating)

In evaluation of samples 17 to 19, samples 18 and 19 each having a surface roughness of the outermost surface of the coating of 0 to 0.15 µm exhibited a tendency to have longer lives than sample 17 having a surface roughness of the outermost surface of the coating greater than 0.15 µm. Thus, preference for a surface roughness Rsurf of the outermost surface of the coating of 0 to 0.15 µm could be verified.

As is obvious from the results described above, samples 18 and 19 are examples, while sample 17 is a comparative example.

(Coating Thickness)

In evaluation of samples 11 to 16, samples 11 to 13 and 15 each having a thickness of the coating of 0.2 to 10 µm exhibited a life superior to sample 16 having no coating, and to sample 14 having a thickness of the coating greater than 10 µm. Thus, preference for a thickness of the coating of 0.2 to 10 µm could be verified.

Note that samples 11 to 16 are all examples.

It is to be appreciated that the presently disclosed embodiment is considered in all respects to be illustrative and not restrictive. The scope of the invention is indicated by the claims rather than by the foregoing description, and all changes that come within the meaning and range of equivalency of the claims are intended to be embraced herein.

The invention claimed is:

1. A cutting tool including a base material and a coating formed on the base material,
    wherein
    said base material is a sintered body containing 30 to 80% by volume of cubic boron nitride, and a binder,
    said binder contains at least one compound formed of at least one element selected from the group consisting of group IV elements, group V elements, and group VI elements of Periodic Table, and aluminum, and at least one element selected from the group consisting of boron, carbon, nitrogen, and oxygen,
    a surface in contact with said coating, of said base material, has a plurality of convex portions made of said cubic boron nitride and a plurality of concave portions made of said binder,
    said coating includes at least one layer having a composition of $M1_xL1_y$ (where x and y represent an atom ratio ($0 < x \leq 1.2$ and $y=1$), M1 is at least one element selected from the group consisting of group IV elements, group V elements, and group VI elements of Periodic Table, aluminum, and silicon, and L1 is at least one element selected from the group consisting of boron, carbon, nitrogen, and oxygen),
    a surface roughness Rsub of the surface in contact with said coating, of said base material, is 0.1 to 0.4 µm,
    a surface roughness Rsurf of an outermost surface of said coating is 0 to 0.15 µm,
    a surface roughness Rasurf of the outermost surface of said coating is 0 to 0.1 µm,
    the surface roughness Rsub of the surface in contact with said coating, of said base material, is greater than the surface roughness Rsurf of the outermost surface of said coating,
    the surface roughness Rsurf representing surface roughness R measured by means of a scanning electron microscope, and
    the surface roughness Rasurf representing surface roughness Ra measured by means of a stylus profilometer.

2. The cutting tool according to claim 1, wherein a thickness of said coating is 0.2 to 10 µm.

3. The cutting tool according to claim 1, wherein
    the surface roughness Rsub of the surface in contact with said coating, of said base material, is 0.1 to 0.15 µm, and
    the surface roughness Rsurf of the outermost surface of said coating is 0 to 0.08 µm.

4. The cutting tool according to claim 1, wherein said sintered body contains 65 to 75% by volume of cubic boron nitride.

5. The cutting tool according to claim 1, wherein
    the surface roughness Rasurf of the outermost surface of said coating is 0 to 0.06 µm.

* * * * *